(12) United States Patent
Lei et al.

(10) Patent No.: US 10,616,948 B2
(45) Date of Patent: Apr. 7, 2020

(54) CONNECTION MANAGEMENT METHOD AND DEVICE IN D2D RELAY COMMUNICATION, TERMINAL AND BASE STATION

(71) Applicant: YULONG COMPUTER TELECOMMUNICATION SCIENTIFIC (SHENZHEN) CO., LTD., Shenzhen (CN)

(72) Inventors: Yi-Xue Lei, Shenzhen (CN); Yun-Fei Zhang, Shenzhen (CN); Qian Zheng, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/028,450

(22) Filed: Jul. 6, 2018

(65) Prior Publication Data

US 2018/0317276 A1  Nov. 1, 2018

Related U.S. Application Data

(63) Continuation of application No. PCT/CN2016/087542, filed on Jun. 29, 2016.

(30) Foreign Application Priority Data

Jan. 7, 2016 (CN) .......................... 2016 1 0013916

(51) Int. Cl.
*H04W 76/27* (2018.01)
*H04W 76/30* (2018.01)
(Continued)

(52) U.S. Cl.
CPC ............ *H04W 76/27* (2018.02); *H04B 7/155* (2013.01); *H04W 72/12* (2013.01); *H04W 76/30* (2018.02);
(Continued)

(58) Field of Classification Search
None
See application file for complete search history.

(56) References Cited

U.S. PATENT DOCUMENTS

2015/0327312 A1  11/2015  Burbidge et al.
2016/0353499 A1* 12/2016  Takano ................. H04W 76/14
(Continued)

FOREIGN PATENT DOCUMENTS

CN  102972087 A  3/2013
CN  104703224 A  6/2015
CN  105101430 A  11/2015

*Primary Examiner* — Kodzovi Acolatse
*Assistant Examiner* — Jay L Vogel
(74) *Attorney, Agent, or Firm* — ScienBiziP, P.C.

(57) ABSTRACT

The present invention discloses a connection management method in device-to-device (D2D) relay communication, a terminal and a base station. The connection management method in D2D relay communication includes: determining whether a relay terminal for performing the D2D relay communication is selected when an Radio Resource Control (RRC) connection between a remote terminal in a network coverage and a base station is not released; when the relay terminal is determined to be selected, determining whether the RRC connection with the base station can be released according to a resource configuration mode used by the remote terminal when performing a D2D communication. By utilizing the connection management method, problems of state transition and connection management of the terminal in the D2D relay communication can be solved.

18 Claims, 8 Drawing Sheets

(51) Int. Cl.

| | | |
|---|---|---|
| *H04B 7/155* | (2006.01) | |
| *H04W 88/04* | (2009.01) | |
| *H04B 7/26* | (2006.01) | |
| *H04W 88/08* | (2009.01) | |
| *H04W 88/02* | (2009.01) | |
| *H04W 76/23* | (2018.01) | |
| *H04W 76/14* | (2018.01) | |
| *H04W 72/12* | (2009.01) | |

(52) U.S. Cl.
CPC ........ *H04B 7/15528* (2013.01); *H04B 7/2606* (2013.01); *H04W 88/02* (2013.01); *H04W 88/04* (2013.01); *H04W 88/08* (2013.01)

(56) References Cited

U.S. PATENT DOCUMENTS

| | | | |
|---|---|---|---|
| 2017/0142741 A1* | 5/2017 | Kaur | H04W 56/002 |
| 2017/0230958 A1* | 8/2017 | Lee | H04W 76/14 |
| 2018/0092022 A1* | 3/2018 | Huang | H04W 40/22 |

* cited by examiner

CONNECTION MANAGEMENT METHOD AND DEVICE IN D2D RELAY COMMUNICATION, TERMINAL AND BASE STATION

CROSS-REFERENCE TO RELATED APPLICATIONS

This application is a continuation-in-part of International Application No. PCT/CN2016/087542, filed on Jun. 29, 2016. This application claims priority of Chinese Patent Application No. 201610013916.X, entitled "connection management method and device in D2D relay communication, terminal and base station," filed on Jan. 7, 2016 in the SIPO (State Intellectual Property Office of the People's Republic of China), the entire contents of which are incorporated by reference herein.

FIELD

The embodiments of the present disclosure relates to a technical field of communication, specifically a connection management method in Device-to-Device (D2D) relay communication, a connection management device in D2D relay communication, a terminal and a base station.

BACKGROUND

3GPP Release 13 introduces discussion of partial coverage scenes, and introduces a concept of Device-to-Device (D2D, which is a direct communication technology between devices introduce in 3GPP Release 12, and is realized by introducing an auxiliary link and is not realized by uplink and downlink of a cellular network system) relay, that is, two or more than two terminals for performing D2D communication, in which, some terminals are located in a coverage area of a network and some terminals are located out of the coverage area of the network. Specifically, as shown in FIG. 1, a partial coverage scene diagram is shown. In the schematic diagram, a relay user equipment (UE) can establish a Radio Resource Control (RRC) connection between a base station, the base station can configure D2D transmission resources for the relay UE, and a remote UE communicates with the relay UE using pre-configured resources. The remote UE can also be located in the coverage area of the network, in such situations, the base station can directly configure D2D communication resources for the remote UE.

At present, RAN2#92 does not explicitly define an RRC state of a remote UE in coverage. The remote UE can be in an idle state, and can also be in a connected state. If the remote UE in the coverage needs to enter the idle state, a base station side does not need to maintain the context of the remote UE. It is represented that if the remote UE in the coverage selects a relay UE, the remote UE needs to initiate signaling to the base station for releasing the UE context; otherwise, the UE cannot enter the idle state. However, if the remote UE is changed into the idle state in this manner, limitations on D2D resource usage is brought. In this way, a UE in the idle state cannot use D2D transmission resources in a scheduling mode, only resources in a resource pool mode can be used. Thus, such a UE state transition limits the flexibility of resource when the remote UE is performing the D2D communication. Particularly, when resource pool is configured insufficiently and scheduling resources are more, the utilization of the D2D communication resources is descended.

Therefore, it is a problem that how to solve a state transition and connection management of a remote terminal in the coverage, needs to be solved, so as to avoid low utilization of the D2D communication resources.

DETAILED DESCRIPTION

In order to more clearly understand the above objectives, features and advantages of the present disclosure, the present disclosure will be further described in detail in the following with reference to the accompanying drawings and embodiments. It should be noted that, embodiments of the present disclosure and features of the embodiments can be combined with each other, when there is no conflict.

Various details are described in the following descriptions for better understanding of the present disclosure, however, the present disclosure may also be implemented in other ways other than those described herein, accordingly, the scope of the present disclosure is not limited by the specific embodiments disclosed below.

Figure 1:
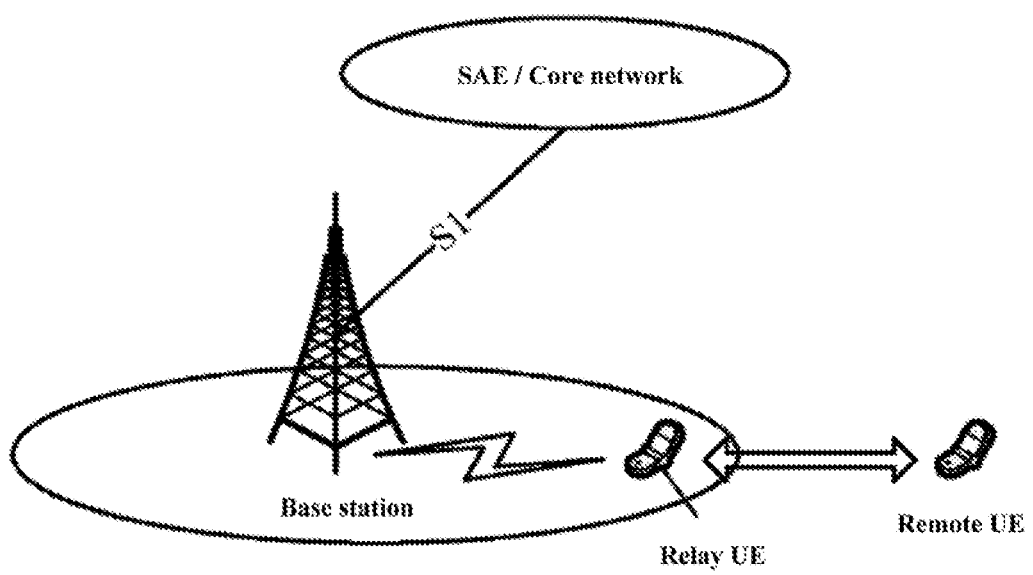
FIG. 1 shows a schematic diagram of partial coverage scenes in D2D communication.
Figure 2:
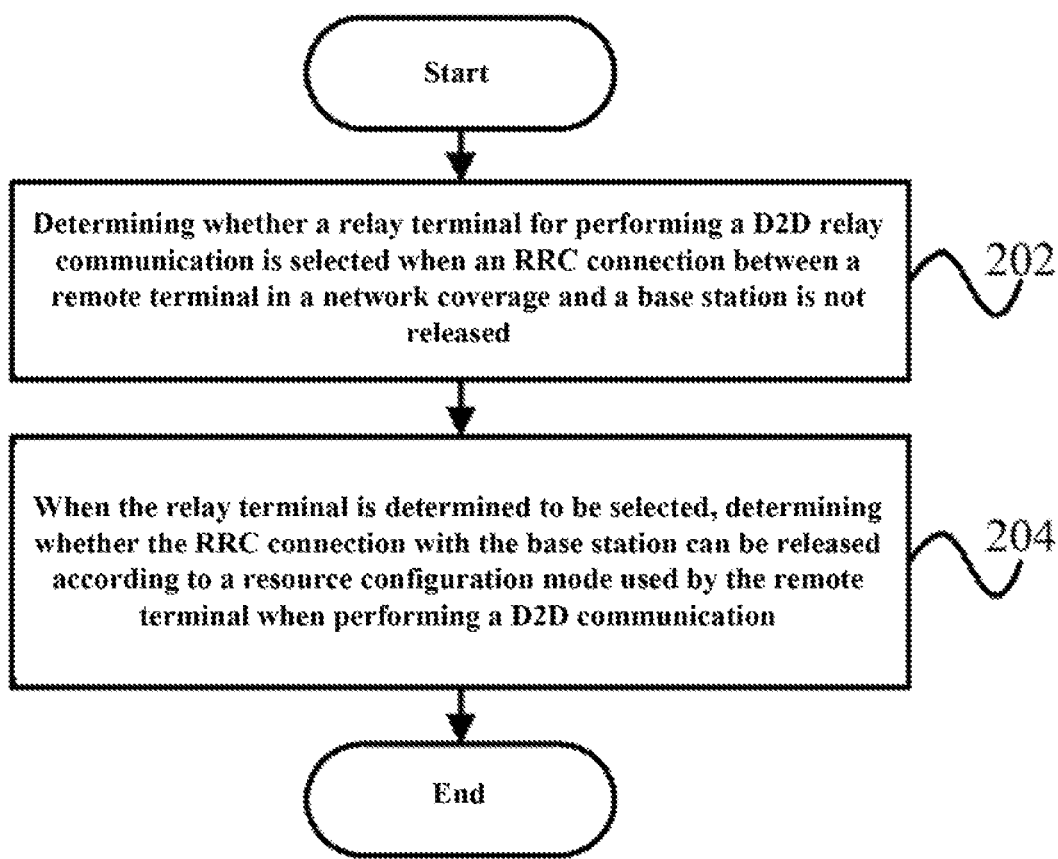
FIG. 2 shows a schematic flowchart of a connection management method in D2D relay communication according to a first embodiment of the present disclosure.

FIG. 2 shows a schematic flowchart of a connection management method in D2D relay communication according to a first embodiment of the present disclosure.

As shown in FIG. 2, according to the first embodiment of the present disclosure, the connection management method in D2D relay communication includes:

Step 202, determining whether a relay terminal for performing the D2D relay communication is selected when an Radio Resource Control (RRC) connection between a remote terminal in a network coverage and a base station is not released;

Step 204, when the relay terminal is determined to be selected, determining whether the RRC connection with the base station can be released according to a resource configuration mode used by the remote terminal when performing a D2D communication.

In the technical solution, when the relay terminal is selected, the remote terminal in the network coverage determines whether the RRC connection with the base station can be released according to the resource configuration mode used by the remote terminal when performing the D2D communication, so that the remote terminal in the network coverage can consider the resource configuration mode used when performing the D2D communication when a RRC state can be changed (that is, when the relay terminal is selected and the RRC state can be changed from a connected state to an idle state), thereby avoiding a problem that the utilization of the D2D communication resources is descended, due to the fact that a state of the remote terminal in the network coverage is changed to be the idle state when the resource pool is configured insufficiently and the scheduling resources are more, and solving problems of the state transition and the connection management of the remote terminal in the D2D relay communication.

In the technical solution as described above, preferably, the step of determining whether the RRC connection with the base station can be released according to the resource configuration mode used by the remote terminal when performing the D2D communication specifically includes: determining that the RRC connection with the base station can be released when the remote terminal uses a resource pool mode when performing the D2D communication.

In the technical solution, as it does not need to maintain the RRC connection with the base station when the relay terminal is selected and the resource pool mode is used, thus, when the remote terminal uses the resource pool mode when performing the D2D communication, it is determined that the RRC connection with the base station can be released, that is, the RRC state can be changed from the connected state to the idle state.

In any of the technical solutions as described above, preferably, the method further includes: sending a request message for changing a resource configuration mode to the base station when the remote terminal uses a scheduling mode when performing the D2D communication; receiving a resource pool configured by the base station and determining that the RRC connection with the base station can be released, when receiving a message that is fed back by the base station and represents that the resource configuration mode is agreed to change; and determining that the RRC connection with the base station cannot be released when receiving a message that is fed back by the base station and represents that the resource configuration mode is refused to change.

In the technical solution, when the remote terminal in the network coverage needs to release the RRC connection with the base station, the resource pool mode needs to be used when performing the D2D communication. Thus, if the remote terminal uses the scheduling mode when performing the D2D communication, the request message for changing the resource configuration mode needs to be sent to the base station, and the base station can determine whether the remote terminal is agreed to change the resource configuration mode according to number of resources of the resource pool mode and number of resources of the scheduling mode, and then the remote terminal further determines whether to release the RRC connection with the base station according to feedback information of the base station.

In any of the technical solutions as described above, preferably, the request message includes identification information used for indicating that the remote terminal has selected the relay terminal.

In any of the technical solutions as described above, preferably, the method further includes: when it is determined that the RRC connection with the base station can be released, sending an RRC connection release request to the base station; when receiving the message that is fed back by the base station and represents that the RRC connection is agreed to release, releasing the RRC connection between the base station to enter the idle state.

In the technical solution, a determination that the RRC connection with the base station can be released is mainly for determining that the remote terminal can use the resource pool mode to perform the D2D communication. The determination specifically includes two aspects: 1) when the remote terminal establishes a connection with the relay terminal, it is determined that the resource pool mode is used when performing the D2D communication; 2) when the remote terminal establishes the connection with the relay terminal, it is determined that the scheduling mode is used when performing the D2D communication, the request message for changing the resource configuration mode is sent to the base station, the base station also agrees to change the resource configuration mode of the remote terminal to the resource pool mode, and the base station allocates a resource pool to the remote terminal.

Figure 3:
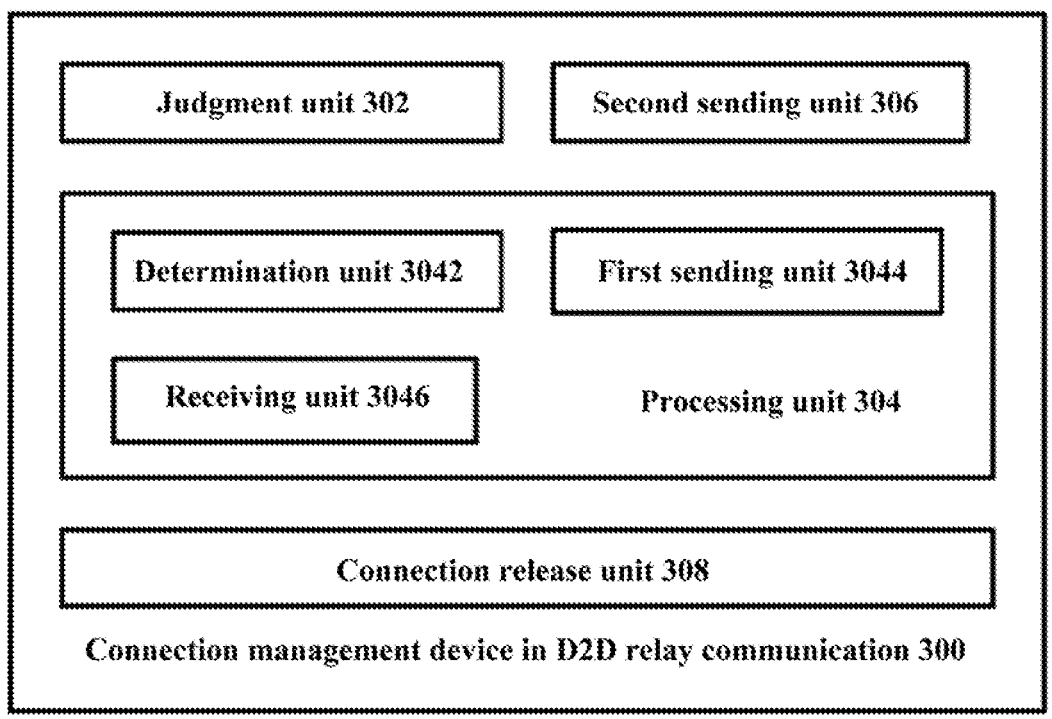
FIG. 3 shows a schematic block diagram of a connection management device in D2D relay communication according to a first embodiment of the present disclosure.

FIG. 3 shows a schematic block diagram of a connection management device in D2D relay communication according to a first embodiment of the present disclosure.

As shown in FIG. 3, the connection management device in D2D relay communication according to the first embodiment of the present disclosure, includes: a judgment unit 302 and a processing unit 304.

The judgment unit 302 is configured for determining whether a relay terminal for performing the D2D relay communication is selected when an Radio Resource Control (RRC) connection between a remote terminal in a network coverage and a base station is not released; and the processing unit 304 is configured for, when the judgment unit determines that the remote terminal selects the relay terminal, determining whether the RRC connection with the base station can be released according to a resource configuration mode used by the remote terminal when performing a D2D communication.

In the technical solution, when the relay terminal is selected, the remote terminal in the network coverage determines whether the RRC connection with the base station can be released according to the resource configuration mode used by the remote terminal when performing the D2D communication, so that the remote terminal in the network coverage can consider the resource configuration mode used when performing the D2D communication when a RRC state can be changed (that is, when the relay terminal is selected and the RRC state can be changed from a connected state to an idle state), thereby avoiding a problem that the utilization of the D2D communication resources is descended, due to the fact that a state of the remote terminal in the network coverage is changed to be the idle state when the resource pool is configured insufficiently and the scheduling resources are more, and solving problems of the state transition and the connection management of the remote terminal in the D2D relay communication.

In the technical solution as described above, preferably, the processing unit 304 includes a determination unit 3042, which is configured for determining that the RRC connection with the base station can be released when the remote terminal uses a resource pool mode when performing the D2D communication.

In the technical solution, as it does not need to maintain the RRC connection with the base station when the relay terminal is selected and the resource pool mode is used, thus, when the remote terminal uses the resource pool mode when performing the D2D communication, it is determined that the RRC connection with the base station can be released, that is, the RRC state can be changed from the connected state to the idle state.

In any of the technical solutions as described above, preferably, the processing unit 304 further includes: a first sending unit 3044 configured for sending a request message for changing a resource configuration mode to the base station when the remote terminal uses a scheduling mode when performing the D2D communication; a receiving unit 3046 configured for receiving a message that is fed back by the base station and represents that the resource configuration mode is agreed to change, and receiving a resource pool configured by the base station; the determination unit 3042 further configured for determining that the RRC connection with the base station can be released when the receiving unit 3046 receives a message that is fed back by the base station and represents that the resource configuration mode is agreed to change, and determining that the RRC connection with the base station cannot be released when the receiving unit 3046 receives a message that is fed back by the base station and represents that the resource configuration mode is refused to change.

In the technical solution, when the remote terminal in the network coverage needs to release the RRC connection with the base station, the resource pool mode needs to be used when performing the D2D communication. Thus, if the remote terminal uses the scheduling mode when performing the D2D communication, the request message for changing the resource configuration mode needs to be sent to the base station, and the base station can determine whether the remote terminal is agreed to change the resource configuration mode according to number of resources of the resource pool mode and number of resources of the scheduling mode, and then the remote terminal further determines whether to release the RRC connection with the base station according to feedback information of the base station.

In any of the technical solutions as described above, preferably, the request message includes identification information used for indicating that the remote terminal has selected the relay terminal.

In any of the technical solutions as described above, preferably, the device further includes: a second sending unit 306 configured for sending an RRC connection release request to the base station, when the processing unit 304 determines that the RRC connection with the base station can be released; a connection release unit 308 configured for releasing the RRC connection between the base station to enter the idle state, when receiving the message that is fed back by the base station and represents that the RRC connection is agreed to release.

In the technical solution, a determination that the RRC connection with the base station can be released is mainly for determining that the remote terminal can use the resource pool mode to perform the D2D communication. The determination specifically includes two aspects: 1) when the remote terminal establishes a connection with the relay terminal, it is determined that the resource pool mode is used when performing the D2D communication; 2) when the remote terminal establishes the connection with the relay terminal, it is determined that the scheduling mode is used when performing the D2D communication, the request message for changing the resource configuration mode is sent to the base station, the base station also agrees to change the resource configuration mode of the remote terminal from the scheduling mode to the resource pool mode, and the base station allocates a resource pool to the remote terminal.

Figure 4:
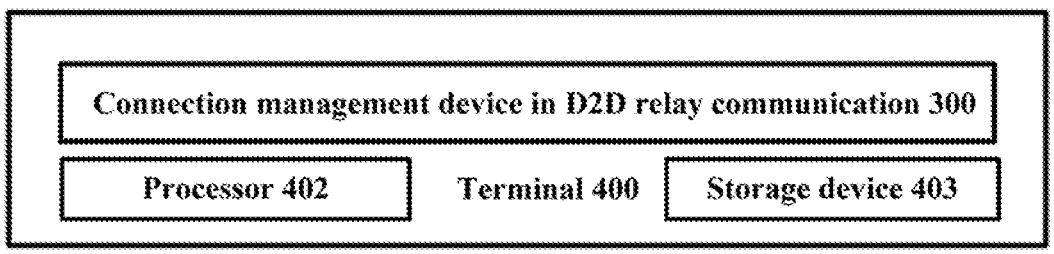
FIG. 4 shows a schematic block diagram of a terminal according to an embodiment of the present disclosure.

FIG. 4 shows a schematic block diagram of a terminal according to an embodiment of the present disclosure.

As shown in FIG. 4, a terminal 400 according to an embodiment of the present disclosure includes: the connection management device 300 in D2D relay communication as shown in FIG. 3.

Figure 5:
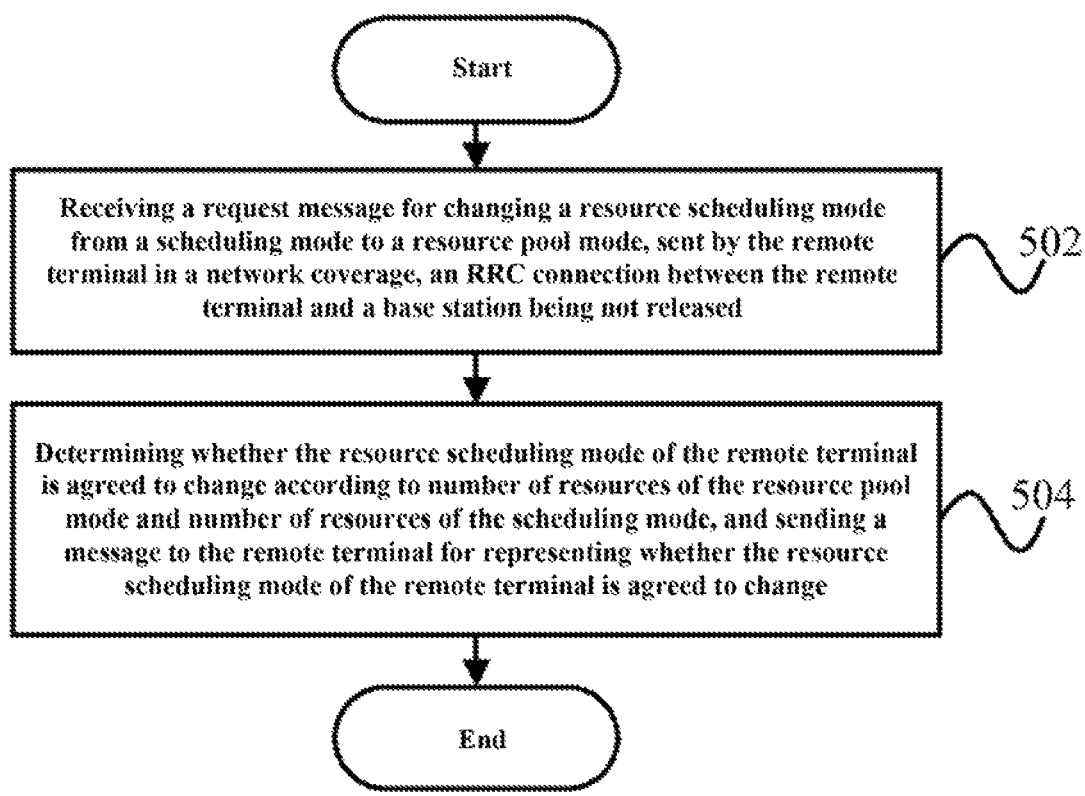
FIG. 5 shows a schematic flowchart of a connection management method in D2D relay communication according to a second embodiment of the present disclosure.

FIG. 5 shows a schematic flowchart of a connection management method in D2D relay communication according to a second embodiment of the present disclosure.

As shown in FIG. 5, the connection management method in D2D relay communication according to the second embodiment of the present disclosure, includes:

Step 502, receiving a request message for changing a resource configuration mode from a scheduling mode to a resource pool mode, sent by the remote terminal in a network coverage, an RRC connection between the remote terminal and a base station being not released;

Step 504, determining whether the resource configuration mode of the remote terminal is agreed to change according to number of resources of the resource pool mode and number of resources of the scheduling mode, and sending a message to the remote terminal for representing whether the resource configuration mode of the remote terminal is agreed to change.

In the technical solution, it is determined whether the resource configuration mode of the remote terminal is agreed to change according to the number of resources of the resource pool mode and the number of resources of the scheduling mode, so that the base station can determine whether to change the resource configuration mode of the remote terminal according to the number of resources of the resource pool mode and the number of resources of the scheduling mode when the remote terminal in the network coverage selects the relay terminal and sends the request message for changing the resource configuration mode to the base station, so as to indirectly control whether the remote terminal changes the RRC state (namely the RRC state is changed from a connected state to an idle state), thereby avoiding a problem that the utilization of the D2D communication resources is descended as a state of the remote terminal in the network coverage is changed to be the idle state when the resource pool is configured insufficiently and the scheduling resources are more, and solving problems of the state transition and the connection management of the remote terminal in the D2D relay communication.

In the technical solution, preferably, a step of determining whether the resource configuration mode of the remote terminal is agreed to change according to the number of resources of the resource pool mode and the number of resources of the scheduling mode, and sending the message to the remote terminal for representing whether the resource configuration mode of the remote terminal is agreed to change, specifically includes:

When the number of resources of the resource pool mode is less than or equal to a first preset value, and the number of resources of the scheduling mode is larger than or equal to a second preset value, determining that the resource configuration mode of the remote terminal is refused to change, and sending a message representing that the resource configuration mode of the remote terminal is refused to change, to the remote terminal;

When the number of resources of the resource pool mode is larger than or equal to a third preset value, determining that the resource configuration mode of the remote terminal is agreed to change, and sending a message representing that the resource configuration mode of the remote terminal is agreed to change, to the remote terminal.

In the technical solution, the base station can determine to agree changing the resource configuration mode of the remote terminal when the number of resource of the resource pool mode is more (namely being larger than or equal to the third preset value), and determine to refuse changing the resource configuration mode of the remote terminal when the number of resource of the resource pool mode is less and the number of resource of the scheduling mode is more, thereby improving the utilization of the D2D communication resources.

In any of the technical solutions as described above, preferably, the method further includes: when receiving an RRC connection release request sent by the remote terminal, feeding back a message representing that the RRC connection is agreed to release, to the remote terminal to make the remote terminal release the RRC connection with the base station.

Figure 6:
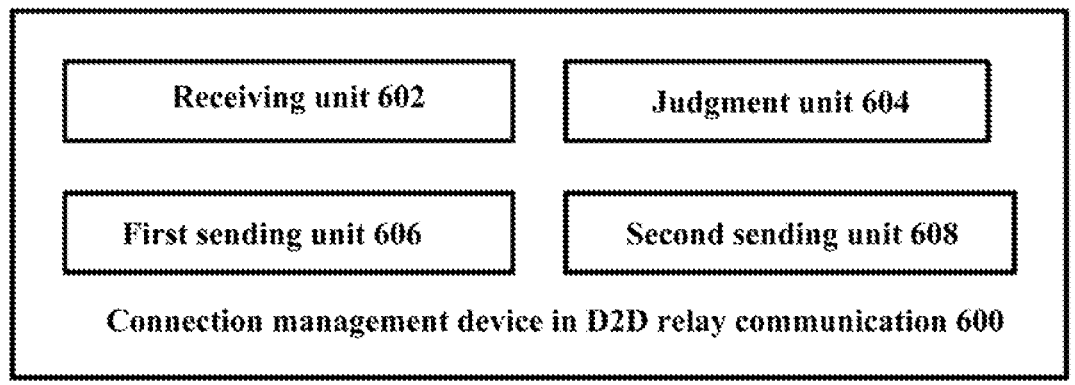
FIG. 6 shows a schematic block diagram of a connection management device in D2D relay communication according to a second embodiment of the present disclosure.

FIG. 6 shows a schematic block diagram of a connection management device in D2D relay communication according to a second embodiment of the present disclosure.

As shown in FIG. 6, the connection management device in D2D relay communication according to the second embodiment of the present disclosure, includes: a receiving unit 602, a judgment unit 604 and a first sending unit 606.

The receiving unit 602 is configured for receiving a request message for changing a resource configuration mode from a scheduling mode to a resource pool mode, sent by the remote terminal in a network coverage, an RRC connection between the remote terminal and a base station being not released; the judgment unit 604 is configured for determining whether the resource configuration mode of the remote terminal is agreed to change according to number of resources of the resource pool mode and number of resources of the scheduling mode; and the first sending unit 606 is configured for sending a message to the remote terminal for representing whether the resource configuration mode of the remote terminal is agreed to change.

In the technical solution, it is determined whether the resource configuration mode of the remote terminal is agreed to change according to the number of resources of the resource pool mode and the number of resources of the scheduling mode, so that the base station can determine whether to change the resource configuration mode of the remote terminal according to the number of resources of the resource pool mode and the number of resources of the scheduling mode when the remote terminal in the network coverage selects the relay terminal and sends the request message for changing the resource configuration mode to the base station, so as to indirectly control whether the remote terminal changes the RRC state (namely the RRC state is changed from a connected state to an idle state), thereby avoiding a problem that the utilization of the D2D communication resources is descended as a state of the remote terminal in the network coverage is changed to be the idle state when the resource pool is configured insufficiently and the scheduling resources are more, and solving problems of the state transition and the connection management of the remote terminal in the D2D relay communication.

In the technical solution, preferably, the judgment unit 604 is specifically configured for determining that the resource configuration mode of the remote terminal is refused to change when the number of resources of the resource pool mode is less than or equal to a first preset value, and the number of resources of the scheduling mode is larger than or equal to a second preset value, and determining that the resource configuration mode of the remote terminal is agreed to change when the number of resources of the resource pool mode is larger than or equal to a third preset value.

The sending unit 606 is specifically configured for sending a message representing that the resource configuration mode of the remote terminal is refused to change, to the remote terminal when the judgment unit 604 determines that the resource configuration mode of the remote terminal is refused to change, and sending a message representing that the resource configuration mode of the remote terminal is agreed to change, to the remote terminal when the judgment unit 604 determines that the resource configuration mode of the remote terminal is agreed to change.

In the technical solution, the base station can determine to agree changing the resource configuration mode of the remote terminal when the number of resource of the resource pool mode is more (namely being larger than or equal to the third preset value), and determine to refuse changing the resource configuration mode of the remote terminal when the number of resource of the resource pool mode is less and the number of resource of the scheduling mode is more, thereby improving the utilization of the D2D communication resources.

Figure 7:
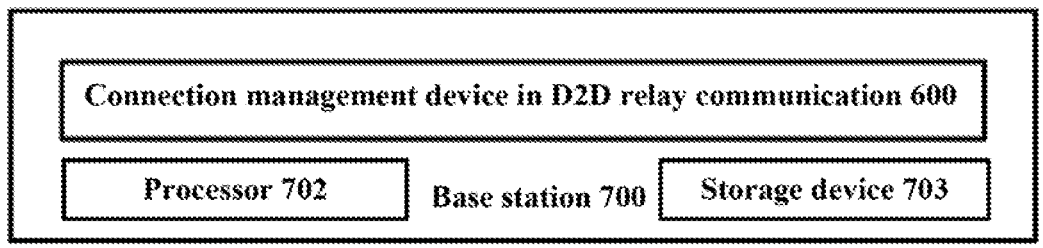
FIG. 7 shows a schematic block diagram of a base station according to an embodiment of the present disclosure.

In any of the technical solutions as described above, preferably, the device further includes a second sending unit 608 configured for, when receiving an RRC connection release request sent by the remote terminal, feeding back a message representing that the RRC connection is agreed to release, to the remote terminal to make the remote terminal release the RRC connection with the base station. FIG. 7 shows a schematic block diagram of a base station according to an embodiment of the present disclosure.

As shown in FIG. 7, a base station 700 according to an embodiment of the present disclosure includes: the connection management device in D2D relay communication as shown in FIG. 6.

In conclusion, the present disclosure is mainly for problems of state transition and connection management of a remote terminal (e.g., a remote UE shown in FIG. 8) in the D2D relay communication, two solutions for remote terminals and base stations are provided specifically:

1. For a Remote Terminal in Coverage

As long as the RRC connection between the base station is not released, once the remote terminal selects a relay UE, the remote terminal determines whether the RRC connection is needed to be released.

The criterion for determining whether the RRC connection is released depends on whether a resource configuration mode used by the remote UE in D2D communication is a scheduling mode or a resource pool mode. If the resource pool mode is used, it is determined that the RRC connection can be released to enter an idle state, the remote UE needs to send an RRC connection release request to the base station; if the scheduling mode is used, the remote UE firstly requests for resources of the resource pool mode to the base station, when the resources of the resource pool mode is obtained, the remote UE sends the RRC connection release request to the base station, thereby entering the idle state.

2. For a Base Station

If a reason of receiving a request for resource of the resource pool mode from the remote UE is "selected a relay UE already", the base station can determine number of the resource of the resource pool mode and number of resource of the scheduling mode. If the resource of the resource pool mode is insufficient and the resource of the scheduling mode is plenty, the base station can refuse the request from the remote UE; otherwise, the base station can agree the request from the remote UE.

When the base station receives the RRC connection release request sent by the remote UE, an agreed command can be fed back to the remote UE, so that the remote UE can enter an idle state.

Figure 8:
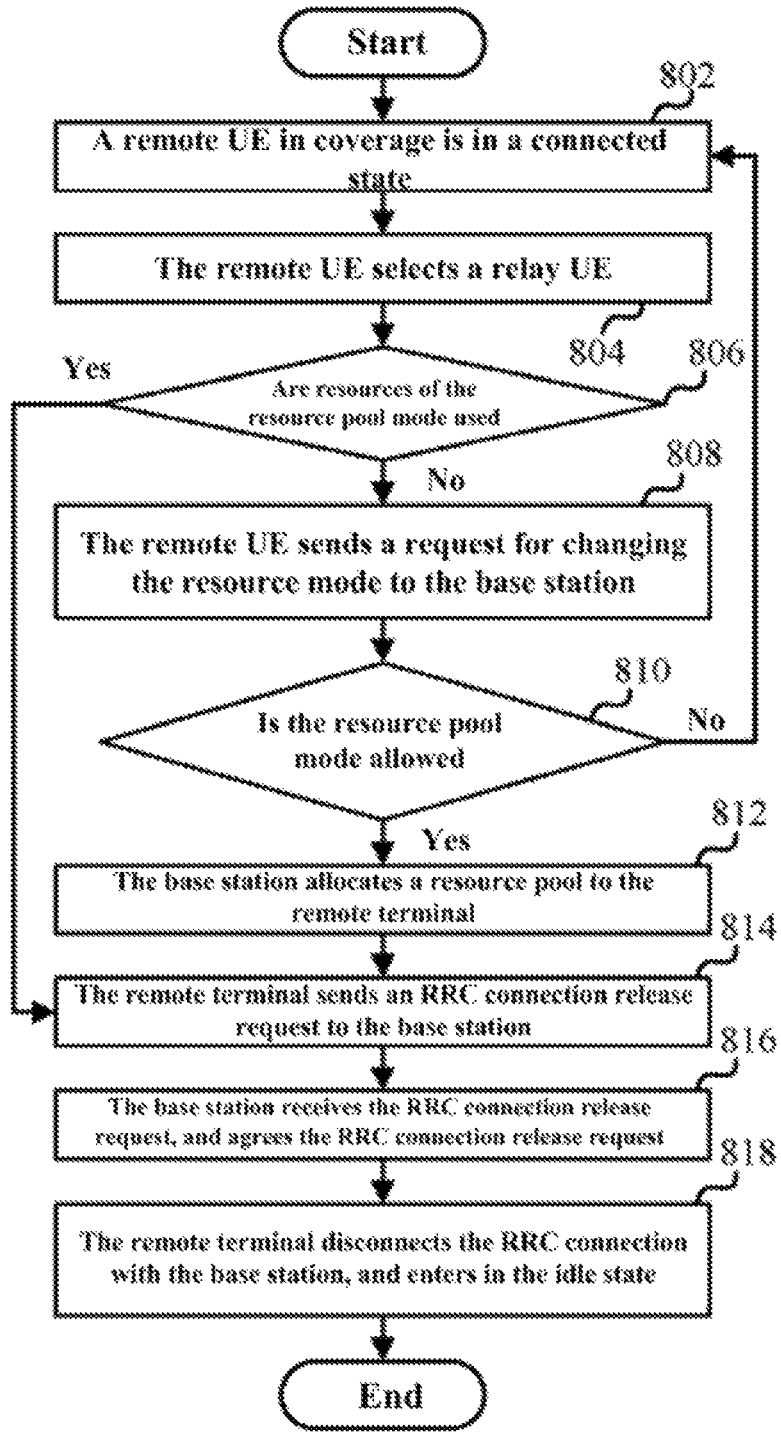
FIG. 8 shows a schematic flowchart of a connection management method in D2D relay communication according to a third embodiment of the present disclosure.

The above process is specifically shown in FIG. 8, and includes:

Step 802, the remote UE in coverage is in a connected state.

Step 804, the remote UE selects a relay UE.

Step 806, the remote UE determines whether the resources of the resource pool mode are used, if the remote UE determines that the resources of the resource pool mode are used, executing step 814; if the remote UE determines that the resources of the scheduling mode are used, executing step 808.

Step 808, the remote UE sends a request for changing the resource configuration mode to the base station, the request includes an explanation of "selected a relay UE already".

Step 810, the base station determines whether the resource pool mode is allowed, if the resource pool mode is allowed, executing step 812; otherwise, if the resource pool mode is refused, returning to step 802. Specifically, the base station determines whether the remote terminal is allowed to transfer into the resource pool mode according to the number of the resources of the resource pool mode and the number of the resources of the scheduling mode.

Step 812, the base station allocates a resource pool to the remote terminal.

Step 814, the remote terminal sends an RRC connection release request to the base station.

Step 816, the base station receives the RRC connection release request, and agrees the RRC connection release request.

Step 818, the remote terminal disconnects the RRC connection with the base station, and enters in the idle state.

The above technical solutions of the present disclosure can solve the problems of the state transition and the connection management of the remote UE in the D2D relay communication, and solve a protocol problem existing in the D2D relay communication scheme.

The word "unit" as used herein, refers to logic embodied in hardware or firmware, or to a collection of software instructions, written in a programming language, such as, for example, Java, C, or assembly. One or more software instructions in the function units may be embedded in firmware (e.g., the connection management device in D2D relay communication 300 or 600). It will be appreciated that the function units may include connected logic modules, such as gates and flip-flops, and may include programmable units, such as programmable gate arrays or processors. The function units described herein may be implemented as either software and/or hardware modules and may be stored in a storage device.

Combined with FIG. 3 and FIG. 4, in one embodiment, the connection management device in D2D relay communication 300 can be a firmware, which may be installed in the terminal 400, which may be a mobile phone, a tablet computer, a personal digital assistant, a notebook computer, or other computing device. The terminal 400 further includes at least one processor 402 and a storage device 403. The at least one processor 402 is used to execute a plurality of units (e.g., the judgment unit 302, the processing unit 304, and other units shown in FIG. 3) in the connection management device in D2D relay communication 300 and other applications, such as an operating system, installed in the terminal 400. The storage device 403 store the computerized instructions of a plurality of units in the connection management device in D2D relay communication 300, and one or more programs, such as the operating system and applications of the terminal 400. The storage device 403 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

Combined with FIG. 6 and FIG. 7, in one embodiment, the connection management device in D2D relay communication 600 can be a firmware, which may be installed in the base station 700. The base station 700 further includes at least one processor 702 and a storage device 703. The at least one processor 702 is used to execute a plurality of units (e.g., the receiving unit 602, the judgment unit 604, and other units shown in FIG. 6) in the connection management device in D2D relay communication 600 and other applications, such as an operating system, installed in the base station 700. The storage device 703 store the computerized instructions of a plurality of units in the connection management device in D2D relay communication 600, and one or more programs, such as the operating system and applications of the base station 700. The storage device 703 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The technical solution of the present disclosure is explicated detailedly in combination with the accompanying drawings, the present disclosure provides a new connection management solution in D2D relay communication, which can solve the problems of the state transition and the connection management of the remote terminal in the D2D relay communication, and avoid a problem that the utilization of the D2D communication resources is descended, due to the fact that a state of the remote terminal in the network coverage is changed to be the idle state when the resource pool is configured insufficiently and the scheduling resources are more.

The above mentioned descriptions are merely preferred embodiments of the present disclosure, and are not to limit the present disclosure. For persons skilled in the art, various changes or modifications may be made to the present disclosure. Any modification, equivalent, and improvement without departing from the spirit and scope of the present disclosure, should be within the protection scope of the present disclosure.

We claim:

1. A connection management method in device-to-device (D2D) relay communication, comprising: under the condition that a relay terminal for performing a device-to-device (D2D) relay communication is determined to be selected when a Radio Resource Control (RRC) connection between a terminal in a network coverage and the base station is not released, in response to a request message for changing a resource configuration mode of the terminal from a scheduling mode to a resource pool mode sent by the terminal, receiving the request message; determining whether the resource configuration mode of the terminal is agreed to change according to number of resources of the resource pool mode and number of resources of the scheduling mode, comprising: determining that the resource configuration mode of the terminal is refused to change when the number of resources of the resource pool mode is less than or equal to a first preset value, and the number of resources of the scheduling mode is larger than or equal to a second preset value; and determining that the resource configuration mode of the terminal is agreed to change when the number of resources of the resource pool mode is larger than or equal to a third preset value; in response to determining that the resource configuration mode of the terminal is refused to change, sending a message representing that the resource configuration mode of the terminal is refused to change to the terminal and in response to determining that the resource configuration mode of the terminal is agreed to change, sending a message representing that the resource configuration mode of the terminal is agreed to change.

2. The connection management method of claim 1, further comprising: when receiving an RRC connection release request sent by the terminal, feeding back a message representing that the RRC connection is agreed to release, to the terminal to make the terminal release the RRC connection with the base station.

3. The connection management method of claim 1, wherein the terminal determines that the RRC connection with the base station can be released in response that the terminal uses the resource pool mode when performing the D2D communication.

4. The connection management method of claim 3, wherein the terminal: receives the resource pool configured by the base station and determines that the RRC connection with the base station can be released, when the message fed back by the base station represents that the resource configuration mode is agreed to change; or determines that the RRC connection with the base station cannot be released when the message fed back by the base station and represents that the resource configuration mode is refused to change.

5. The connection management method of claim 1, wherein the request message comprises identification information used for indicating that the terminal has selected the relay terminal.

6. The connection management method of claim 1, wherein the terminal further: in response that the RRC connection with the base station can be released, sends an RAC connection release request to the base station; in response to the message that is fed back by the base station and represents that the RRC connection is agreed to release, releases the RRC connection between the base station to enter the idle state.

7. A terminal, comprising: at least one processor; and a storage device storing a plurality of instructions, which when executed by the processor, causes the at least one processor to: determine whether a relay terminal for performing a device-to-device (D2D) relay communication is selected when a Radio Resource Control (RRC) connection between the terminal in a network coverage and a base station is not released; when the relay terminal is determined to be selected, determine whether the RRC connection with the base station can be released according to a resource configuration mode used by the terminal when performing a D2D communication, and sends a request message for changing a resource configuration mode from a scheduling mode to a resource pool mode, to the base station when the terminal uses a scheduling mode, wherein the base station: receives the request message from the terminal; determines whether the resource configuration mode of the terminal is agreed to change according to number of resources of the resource pool mode and number of resources of the scheduling mode, comprising: determining that the resource configuration mode of the terminal is refused to change when the number of resources of the resource pool mode is less than or equal to a first preset value, and the number of resources of the scheduling mode is larger than or equal to a second preset value, and determining that the resource configuration mode of the terminal is agreed to change when the number of resources of the resource pool mode is larger than or equal to a third preset value; in response to determining that the resource configuration mode of the terminal is refused to change, sends a message representing that the resource configuration mode of the terminal is refused to change, and in response to determining that the resource configuration mode of the terminal is agreed to change, sends a message representing that the resource configuration mode of the terminal is agreed to change, to the terminal.

8. The terminal of claim 7, wherein the at least one processor further determines that the RRC connection with the base station can be released when the terminal uses the resource pool mode when performing the D2D communication.

9. The terminal of claim 8, wherein the at least one processor further: receives the message that is fed back by the base station and represents that the resource configuration mode is agreed to change, and receives a resource pool configured by the base station; determines that the RRC connection with the base station can be released when the message represents that the resource configuration mode is agreed to change; or determines that the RRC connection with the base station cannot be released when the message represents that the resource configuration mode is refused to change.

10. The terminal of claim 7, wherein the request message comprises identification information used for indicating that the terminal has selected the relay terminal.

11. The terminal of claim 7, wherein the at least one processor further: sends an RRC connection release request to the base station, when it is determined that the RRC connection with the base station can be released; releases the RRC connection between the terminal and the base station to enter the idle state, when receiving the message that is fed back by the base station and represents that the RRC connection is agreed to release.

12. The terminal of claim 7, wherein the base station further: when receiving an RRC connection release request sent by the terminal, feeds back a message representing that the RRC connection is agreed to release, to the terminal to make the terminal release the RRC connection with the base station.

13. A base station, comprising: at least one processor; and a storage device storing a plurality of instructions, which when executed by the processor, causes the at least one processor to: under the condition that a relay terminal for performing a device-to-device (D2D) relay communication is determined to be selected when a Radio Resource Control (RRC) connection between a terminal in a network coverage and the base station is not released, in response to a request message for changing a resource configuration mode of the terminal from a scheduling mode to a resource pool mode sent by the terminal, receive the request message; determine whether the resource configuration mode of the terminal is agreed to change according to number of resources of the resource pool mode and number of resources of the scheduling mode, comprising: determining that the resource configuration mode of the terminal is refused to change when the number of resources of the resource pool mode is less than or equal to a first preset value, and the number of resources of the scheduling mode is larger than or equal to a second preset value; and determining that the resource configuration mode of the terminal is agreed to change when the number of resources of the resource pool mode is larger than or equal to a third preset value; in response to determining that the resource configuration mode of the terminal is refused to change, send a message representing that the resource configuration mode of the terminal is refused to change, and in response to determining that the resource configuration mode of the terminal is agreed to change, send a message representing that the resource configuration mode of the terminal is agreed to change, to the terminal.

14. The base station of claim 13, wherein the at least one processor further: when receiving a RRC connection release request sent by the terminal, feeds back a message representing that the RRC connection is agreed to release, to the terminal to make the terminal release the RRC connection with the base station.

15. The base station of claim 13, wherein the terminal determines that the RRC connection with the base station can be released in response that the terminal uses the resource pool mode when performing the D2D communication.

16. The base station of claim 15, wherein the terminal: receives the resource pool configured by the base station and determines that the RRC connection with the base station can be released, when the message fed back by the base station represents that the resource configuration mode is agreed to change; or determines that the RRC connection with the base station cannot be released when the message fed back by the base station and represents that the resource configuration mode is refused to change.

17. The base station of claim 13, wherein the request message comprises identification information used for indicating that the terminal has selected the relay terminal.

18. The base station of claim 13, wherein the terminal further: in response that the RRC connection with the base station can be released, sends an RRC connection release request to the base station; in response to the message that is fed back by the base station and represents that the RRC connection is agreed to release, releases the RRC connection between the base station to enter the idle state.

* * * * *